(12) United States Patent
Kataoka et al.

(10) Patent No.: US 11,300,127 B2
(45) Date of Patent: Apr. 12, 2022

(54) ELECTRIC OIL PUMP AND CONTROL BOARD ARRANGEMENT

(71) Applicant: NIDEC TOSOK CORPORATION, Kanagawa (JP)

(72) Inventors: Shigehiro Kataoka, Kanagawa (JP); Yoshiyuki Kobayashi, Kanagawa (JP)

(73) Assignee: NIDEC TOSOK CORPORATION, Kanagawa (JP)

(*) Notice: Subject to any disclaimer, the term of this patent is extended or adjusted under 35 U.S.C. 154(b) by 118 days.

(21) Appl. No.: 16/218,501

(22) Filed: Dec. 13, 2018

(65) Prior Publication Data

US 2019/0195349 A1 Jun. 27, 2019

(30) Foreign Application Priority Data

Dec. 21, 2017 (JP) .............................. JP2017-245618

(51) Int. Cl.
*F04D 13/06* (2006.01)
*H02K 11/33* (2016.01)
(Continued)

(52) U.S. Cl.
CPC ..... *F04D 13/0686* (2013.01); *F04D 13/0693* (2013.01); *H02K 5/225* (2013.01);
(Continued)

(58) Field of Classification Search
CPC .... H02K 11/33; H02K 5/225; F16H 61/0031; F16N 13/20; F16N 2013/063; F01M 1/02; F01M 2001/0292; F01M 2001/0253; F01M 2001/0284; F01M 2001/0215; B60W 10/30; F04D 13/0686; F04D 13/0693; F04D 25/068; F04D 25/0693; F04D 29/406; F04C 15/008; F04C 29/0085; F04C 2240/30; F04C 2240/808; F04C 2240/805

See application file for complete search history.

(56) References Cited

U.S. PATENT DOCUMENTS 5,491,370 A * 2/1996 Schneider .............. H02K 7/006
                                              310/54
6,211,631 B1 * 4/2001 Wilson-Jones ...... B62D 5/0406
                                              318/12
(Continued)

FOREIGN PATENT DOCUMENTS

JP    2012029793    2/2012
WO    2012093678    7/2012

*Primary Examiner* — Nathan C Zollinger
(74) *Attorney, Agent, or Firm* — JCIPRNET (57) ABSTRACT

An electric oil pump includes a motor part having a shaft; a pump part that is driven by the motor part via the shaft and discharges oil; and a control part configured to control an operation of the motor part. The motor part includes a rotor, a stator, and a motor housing in which the rotor and the stator are accommodated. The pump part includes a pump rotor attached to the shaft and a pump housing having a housing part in which the pump rotor is accommodated. The control part includes an electronic component and a board having a surface on which the electronic component is mounted. The board is disposed outside the stator in a radial direction and within a range of the motor part in the axial direction, and the surface of the board is disposed to face the stator and extends in the axial direction.

12 Claims, 6 Drawing Sheets

(51) Int. Cl.
*H02K 5/22* (2006.01)
*F01M 1/02* (2006.01)
*F16N 13/20* (2006.01)
*F16N 13/06* (2006.01)
*F04C 15/00* (2006.01)

(52) U.S. Cl.
CPC .............. *H02K 11/33* (2016.01); *F01M 1/02* (2013.01); *F01M 2001/0215* (2013.01); *F01M 2001/0253* (2013.01); *F01M 2001/0284* (2013.01); *F04C 15/008* (2013.01); *F04C 2240/30* (2013.01); *F04C 2240/803* (2013.01); *F04C 2240/808* (2013.01); *F16N 13/20* (2013.01); *F16N 2013/063* (2013.01)

(56) References Cited

U.S. PATENT DOCUMENTS

| | | | |
|---|---|---|---|
| 9,831,580 B2* | 11/2017 | Mitteer | H01R 12/72 |
| 2004/0061391 A1* | 4/2004 | Matsuyama | H02K 5/225 |
| | | | 310/71 |
| 2008/0304988 A1* | 12/2008 | Asaka | B60S 1/603 |
| | | | 417/500 |
| 2014/0037472 A1 | 2/2014 | Hibi et al. | |
| 2017/0002807 A1* | 1/2017 | Kogiso | F01M 1/02 |

* cited by examiner

ELECTRIC OIL PUMP AND CONTROL BOARD ARRANGEMENT

CROSS REFERENCE TO RELATED APPLICATIONS

The application claims priority under 35 U.S.C. § 119 to Japanese Patent Application No. 2017-245618 filed on Dec. 21, 2017, the entire content of which is incorporated herein by reference and made a part of this specification.

BACKGROUND

Technical Field

The disclosure relates to an electric oil pump.

Description of Related Art

An electric oil pump having a structure including a pump part, a motor part configured to drive the pump part, and a control part configured to control an operation of the motor part is known. In this electric oil pump, the pump part is disposed on one side of the motor part in the axial direction and a shaft that extends from the motor part penetrates a pump body of the pump part. On one side end surface of the pump body in the axial direction, a housing part in which one side is open in the axial direction of the pump body and the other side in the axial direction is recessed is provided. A pump rotor is accommodated in the housing part. In addition, the control part has a board on which electronic components that drive the motor part are mounted.

For example, an electric pump including a pump, a motor configured to drive the pump, and a board configured to control the motor may be exemplified. As a technique of the related art using this configuration, an electronic sphygmomanometer may be exemplified. Specifically, the electronic sphygmomanometer having a structure including a pump for introducing air into a cuff attached to a part of a subject on which measurement is performed, a pump motor configured to drive the pump, and a board configured to control an electronic sphygmomanometer is described. The board is disposed above a motor part of the pump motor and a surface of the board on which an electronic component is mounted is disposed in the axial direction along the central axis of the shaft of the pump motor.

An internal space of a housing of an electronic sphygmomanometer of the related art is larger than the size of the pump. In addition, while the other side of the board disposed above the pump part in the axial direction protrudes from the other side end of the pump part in the axial direction, it is disposed above the pump part. Therefore, there is less demand for downsizing the pump of the electronic sphygmomanometer of the related art than the electric oil pump.

On the other hand, for example, in electric oil pumps applied to vehicles, there is strong demand for downsizing for securing minimum ground clearance for the vehicles. Therefore, when the pump and the board in the electronic sphygmomanometer of the related art are applied to the electric oil pump, there is a risk of the size of the electric oil pump increasing.

SUMMARY

According to an exemplary embodiment of the disclosure, there is provided an electric oil pump including a motor part having a shaft disposed along a central axis that extends in an axial direction; a pump part that is positioned on one side of the motor part in the axial direction and is driven by the motor part via the shaft and discharges oil; and a control part configured to control an operation of the motor part. The motor part includes a rotor fixed to the other side of the shaft in the axial direction, a stator disposed to face the rotor, and a motor housing in which the rotor and the stator are accommodated. The pump part includes a pump rotor attached to the shaft that protrudes from the motor part to one side in the axial direction and a pump housing having a housing part in which the pump rotor is accommodated. The control part includes an electronic component and a board having a surface on which the electronic component is mounted. The board is disposed outside the stator in a radial direction and within a range of the motor part in the axial direction, and the surface of the board is disposed to face the stator and extends in the axial direction.

The above and other elements, features, steps, characteristics and advantages of the present disclosure will become more apparent from the following detailed description of the exemplary embodiments with reference to the attached drawings.

DESCRIPTION OF THE EMBODIMENTS

The disclosure is to provide an electric oil pump which has a board and can be reduced in size.

An electric oil pump according to an embodiment of the disclosure will be described below with reference to the drawings. In the present embodiment, an electric oil pump configured to supply oil to a transmission mounted on a vehicle such as an automobile will be described. In addition, in the following drawings, in order to allow respective configurations to be easily understood, actual structures and scales and numbers in the structures may be different therefrom.

In addition, in the drawings, an XYZ coordinate system is appropriately shown as a three-dimensional orthogonal coordinate system. In the XYZ coordinate system, the Z axis direction is a direction parallel to an axial direction of a central axis J shown in FIG. 1 (a vertical direction in FIG. 1). The X axis direction is a direction parallel to a lateral direction of an electric oil pump shown in FIG. 1, that is, a direction orthogonal to the plane of the paper in FIG. 1. The Y axis direction is a direction orthogonal to both the X axis direction and the Z axis direction.

In addition, in the following description, the positive side (+Z side) in the Z axis direction will be referred to as "rear side" and the negative side (−Z side) in the Z axis direction will be referred to as "front side." Here, the rear side and the front side are terms that are simply used for explanation, and do not limit actual positional relationships and directions. In addition, unless otherwise noted, a direction (Z axis direction) parallel to the central axis J is simply defined as an "axial direction," a radial direction around the central axis J is simply defined as a "radial direction," and a circumferential direction around the central axis J, that is, a circumference (θ direction) around the central axis J is simply defined as a "circumferential direction."

Here, in this specification, the term "extending in the axial direction" includes not only extending strictly in the axial direction (the Z axial direction) but also extending in a direction inclined in a range of less than 45° with respect to the axial direction. In addition, in this specification, the term "extending in the radial direction" includes not only extending strictly in the radial direction, that is, extending in a direction perpendicular to the axial direction (the Z axial direction), but also extending in a direction inclined in a range of less than 45° with respect to the radial direction.

Figure 1:
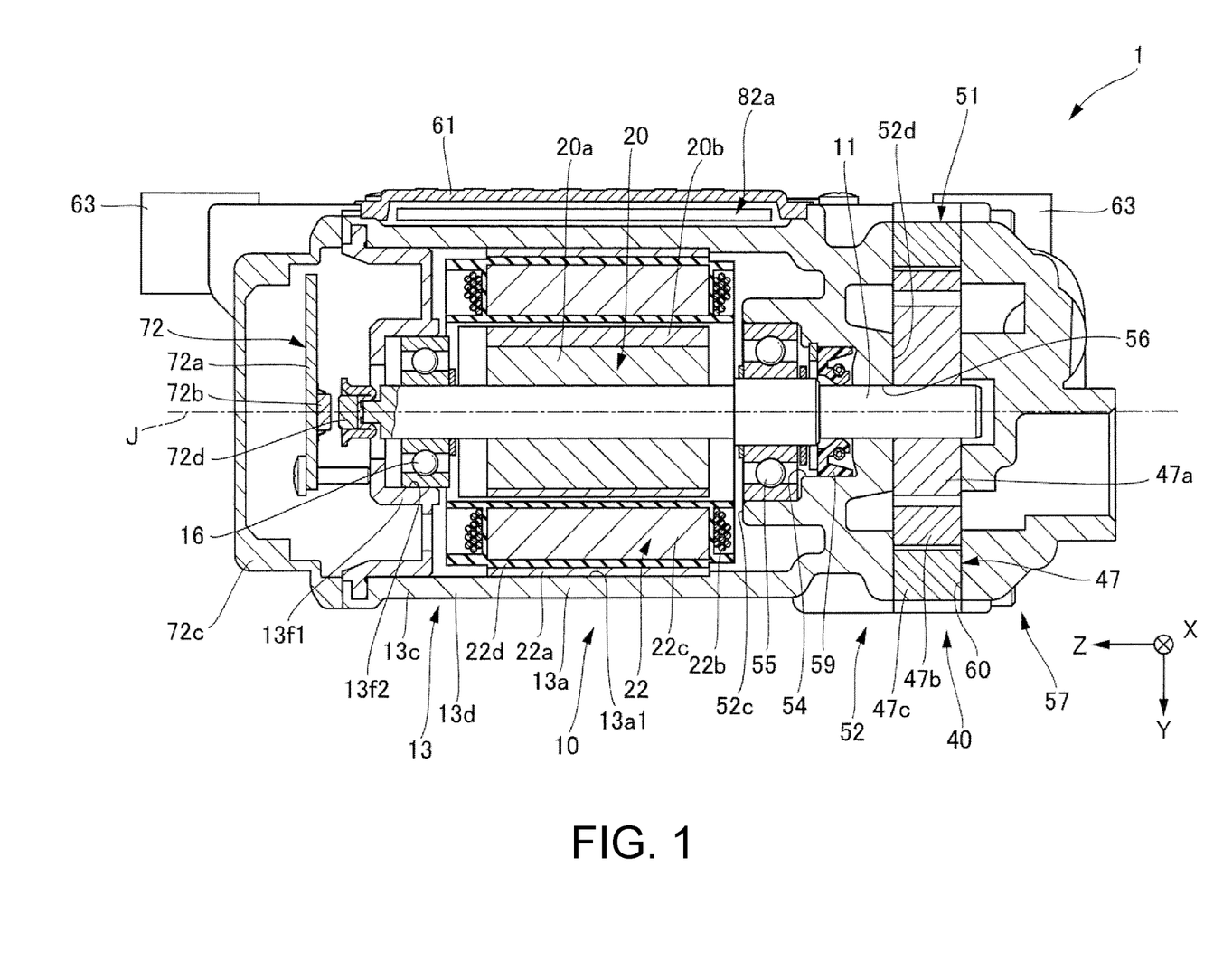
FIG. 1 is a cross-sectional view of an electric oil pump according to a first embodiment.
Figure 2:
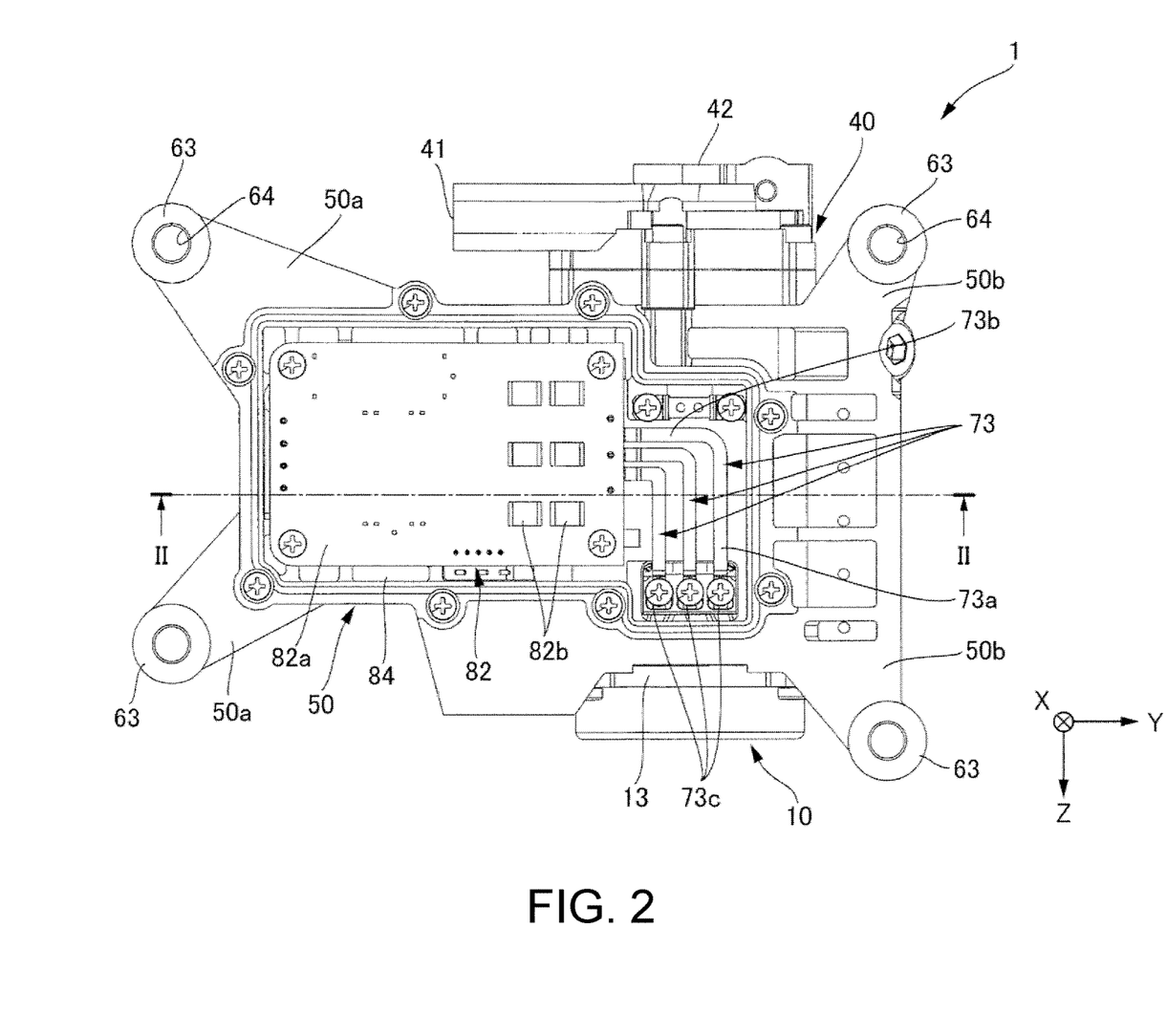
FIG. 2 is a plan view of the electric oil pump in which illustration of a board cover is omitted.

FIG. 1 is a cross-sectional view of an electric oil pump according to a first embodiment. FIG. 2 is a plan view of the electric oil pump in which illustration of a board cover is omitted. As shown in FIG. 1 and FIG. 2, an electric oil pump 1 of the present embodiment includes a motor part 10, a pump part 40, and a control part 82. The motor part 10 has a shaft 11 that is disposed along the central axis J that extends in the axial direction. The pump part 40 is positioned on one side (front side) of the motor part 10 in the axial direction and is driven by the motor part 10 via the shaft 11, and discharges oil. The control part 82 is disposed on the positive side in the X axis direction with respect to the motor part and controls an operation of the motor part 10. Constituent members will be described below in detail.

As shown in FIG. 1, the motor part 10 includes the shaft 11, a rotor 20, a stator 22, and a cylindrical part 13d of a motor housing 13.

The motor part 10 is, for example, an inner rotor type motor, the rotor 20 is fixed to the outer circumferential surface of the shaft 11, and the stator 22 is disposed outside the rotor 20 in the radial direction. The rotor 20 is fixed to the other side of the shaft 11 in the axial direction (the rear side with respect to the pump part 40). The stator 22 is disposed to face the rotor 20.

The motor housing 13 includes the cylindrical part 13d having a cylindrical shape that covers the stator 22 and a case 50 that extends in a direction orthogonal to the axial direction from the outer surface of the cylindrical part 13d. The rotor 20 and the stator 22 are accommodated in the cylindrical part 13d. The motor housing 13 includes a stator holding part 13a, a board support 13b (refer to FIG. 3), and a holding part 13c. The motor housing 13 is made of a metal. The cylindrical part 13d and the case 50 are integrally molded. Therefore, the cylindrical part 13d and the case 50 are a single member. A motor cover 72c is disposed at an end of the other side (rear side) of the cylindrical part 13d in the axial direction and an opening on the other side (rear side) of the cylindrical part 13d in the axial direction is covered with the motor cover 72c.

The stator holding part 13a has a cylindrical shape that extends in the axial direction. The shaft 11 of the motor part 10, the rotor 20 and the stator 22 are disposed in the stator holding part 13a. The outer surface of the stator 22, that is, the outer surface of a core back part 22a (to be described below), is fitted to an inner circumferential surface 13a1 of the stator holding part 13a. Thereby, the stator 22 is accommodated in the stator holding part 13a.

Figure 3:
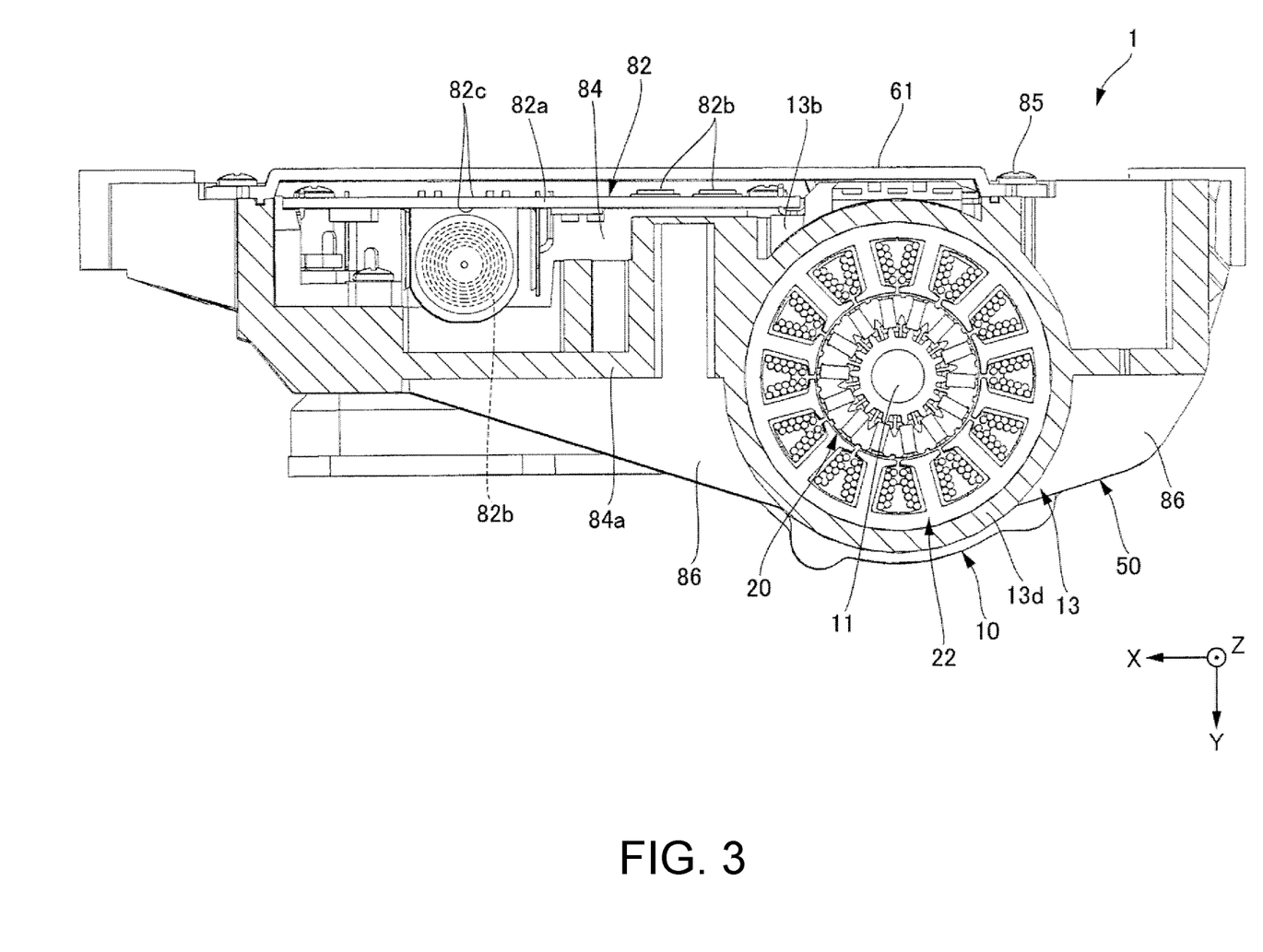
FIG. 3 is a cross-sectional view of the electric oil pump taken along the arrow II-II in FIG. 2.

FIG. 3 is a cross-sectional view of the electric oil pump 1 taken along the arrow II-II in FIG. 2. As shown in FIG. 3, the board support 13b extends radially outward from the cylindrical part 13d of the motor housing 13 and supports a board 82a of the control part 82. The board support 13b is integrally molded with the case 50. Therefore, the board support 13b and the case 50 are a single member.

As shown in FIG. 1, the holding part 13c is provided at the rear side end of the cylindrical part 13d of the motor housing 13. A bearing housing part 13f1 is disposed at the rear side end of the cylindrical part 13d of the motor housing 13 which is on the inner side of the holding part 13c in the radial direction. The bearing housing part 13f1 has a housing concave part 13f2 in which the front side is open and the rear side is recessed. The housing concave part 13f2 of the bearing housing part 13f1 has a circular shape when viewed from the front side. The bearing housing part 13f1 is disposed coaxially with the central axis J of the shaft 11. A bearing 16 provided in the housing concave part 13f2 of the bearing housing part 13f1 supports the rear side end of the shaft 11.

As shown in FIG. 1, the rotor 20 is fixed to the rear side of the shaft 11 with respect to the pump part 40. The rotor 20 includes a rotor core 20a and a rotor magnet 20b. The rotor core 20a surrounds a circumference (θ direction) around the shaft 11 and is fixed to the shaft 11. The rotor magnet 20b is fixed to the outer surface along a circumference (θ direction) around the rotor core 20a. The rotor core 20a and the rotor magnet 20b rotate together with the shaft 11. Here, the rotor 20 may be an embedded magnet type in which a permanent magnet is embedded inside the rotor 20. Compared to a surface magnet type in which a permanent magnet is provided on the surface of the rotor 20, in the embedded magnet type rotor 20, it is possible to reduce a risk of the magnet being peeled off due to a centrifugal force, and it is possible to actively use a reluctance torque.

The stator 22 is disposed to face the rotor 20 outside the rotor 20 in the radial direction and surrounds a circumference (θ direction) around the rotor 20 and rotates the rotor 20 around the central axis J. The stator 22 includes the core back part 22a, a tooth part 22c, a coil 22b, and an insulator (bobbin) 22d.

The shape of the core back part 22a is a cylindrical shape concentric with the shaft 11. The tooth part 22c extends from the inner surface of the core back part 22a toward the shaft 11. A plurality of tooth parts 22c are provided and are disposed at uniform intervals in the circumferential direction on the inner surface of the core back part 22a. The coil 22b is wound around the insulator 22d. The insulator 22d is attached to each of the tooth parts 22c.

As shown in FIG. 1, the shaft 11 extends around the central axis J that extends in the axial direction and penetrates the motor part 10. The front side (−Z side) of the shaft 11 protrudes from the motor part 10 and extends into the pump part 40. The front side of the shaft 11 is fixed to an inner rotor 47a of the pump part 40. The front side of the shaft 11 is supported by a bearing 55 (to be described below). Therefore, the shaft 11 is supported at both ends.

As shown in FIG. 3, the control part 82 includes the board 82a and a plurality of electronic components 82b mounted on the board 82a. The control part 82 generates a signal for driving the motor part 10 and outputs the signal to the motor part 10. The board 82a is supported by and fixed to the board support 13b that extends radially outward from the cylindrical part 13d of the motor housing 13.

Here, as shown in FIG. 1, a rotation angle sensor 72b configured to detect a rotation angle of the shaft 11 is disposed at a position inside the motor cover 72c which faces the rear side end of the shaft 11. The rotation angle sensor 72*b* is mounted on a circuit board 72*a*. The circuit board 72*a* is supported by and fixed to a board support (not shown) fixed to the rear side end of the cylindrical part 13*d* of the motor housing 13. A magnet for a rotation angle sensor 72*d* is disposed at and fixed to the rear side end of the shaft 11. The rotation angle sensor 72*b* faces the magnet for a rotation angle sensor 72*d* and is disposed on the rear side of the magnet for a rotation angle sensor 72*d*. When the shaft 11 rotates, the magnet for a rotation angle sensor 72*d* also rotates and thereby a magnetic flux changes. The rotation angle sensor 72*b* detects a change in the magnetic flux due to rotation of the magnet for a rotation angle sensor 72*d* and thereby detects a rotation angle of the shaft 11.

As shown in FIG. 1, the pump part 40 is positioned on one side (front side) of the motor part 10 in the axial direction. The pump part 40 is driven by the motor part 10 via the shaft 11. The pump part 40 includes a pump rotor 47 and a pump housing 51. In the present embodiment, the pump housing 51 includes a pump body 52 and a pump cover 57. The pump housing 51 has a housing part 60 for accommodating the pump rotor 47 between the pump body 52 and the pump cover 57. These components will be described below in detail.

As shown in FIG. 1, the pump body 52 is positioned at the front side end of the cylindrical part 13*d* of the motor housing 13. The pump body 52 has a concave part 54 that is recessed from an end surface 52*c* on the rear side (+Z side) to the front side (−Z side). The bearing 55 and a sealing member 59 are sequentially accommodated in the concave part 54 from the rear side to the front side. The bearing 55 supports the shaft 11 that protrudes from the motor part 10 to one side (front side) in the axial direction. The sealing member 59 seals oil leaking from the pump rotor 47. The pump body 52 is the same member as the cylindrical part 13*d* of the motor housing 13.

The pump body 52 has a through-hole 56 that penetrates along the central axis J. Both ends of the through-hole 56 in the axial direction are open and the shaft 11 passes therethrough, and an opening on the rear side (+Z side) opens to the concave part 54 and an opening on the front side (−Z side) opens to an end surface 52*d* on the front side of the pump body 52.

As shown in FIG. 1, the pump rotor 47 is attached to the front side of the shaft 11. The pump rotor 47 includes the inner rotor 47*a*, an outer rotor 47*b*, and a rotor body 47*c*. The pump rotor 47 is attached to the shaft 11. More specifically, the pump rotor 47 is attached to the front side (−Z side) of the shaft 11. The inner rotor 47*a* is fixed to the shaft 11. The outer rotor 47*b* surrounds the outside of the inner rotor 47*a* in the radial direction. The rotor body 47*c* surrounds the outside of the outer rotor 47*b* in the radial direction. The rotor body 47*c* is fixed to the pump body 52.

The inner rotor 47*a* has an annular shape. The inner rotor 47*a* is a gear having teeth on the outer surface in the radial direction. The inner rotor 47*a* rotates around a circumference (θ direction) together with the shaft 11. The outer rotor 47*b* has an annular shape surrounding the outside of the inner rotor 47*a* in the radial direction. The outer rotor 47*b* is a gear having teeth on the inner surface in the radial direction. The outer surface of the outer rotor 47*b* in the radial direction has a circular shape. The inner surface of the rotor body 47*c* in the radial direction has a circular shape.

The gear on the outer surface of the inner rotor 47*a* in the radial direction is engaged with the gear on the inner surface of the outer rotor 47*b* in the radial direction, and the outer rotor 47*b* is rotated according to rotation of the inner rotor 47*a* by the shaft 11. That is, the pump rotor 47 rotates according to rotation of the shaft 11. In other words, the motor part 10 and the pump part 40 have the same rotation axis. Thereby, it is possible to prevent the size of the electric oil pump 1 from becoming larger in the axial direction.

In addition, when the inner rotor 47*a* and the outer rotor 47*b* rotate, a volume between engaging parts of the inner rotor 47*a* and the outer rotor 47*b* changes. An area in which the volume decreases is a pressurized area and an area in which the volume increases is a negative pressure area. An intake port (not shown) of the pump cover 57 is disposed on the front side of the negative pressure area of the pump rotor 47. In addition, a discharge port of the pump cover 57 (not shown) is disposed on the front side of a pressurized area of the pump rotor 47.

As shown in FIG. 1, the pump cover 57 is attached to the front side of the pump rotor 47. The pump cover 57 is fixed to the rotor body 47*c* of the pump rotor 47. The pump cover 57 is attached and fixed to the pump body 52 together with the rotor body 47*c* of the pump rotor 47. The pump cover 57 has an intake opening 41 (refer to FIG. 2) connected to the intake port. The pump cover 57 has a discharge opening 42 (refer to FIG. 2) connected to the discharge port.

Oil sucked into the pump rotor 47 from the intake opening 41 provided at the pump cover 57 through the intake port of the pump cover 57 is stored in a volume part between the inner rotor 47*a* and the outer rotor 47*b* and is sent to the pressurized area. Then, the oil is discharged from the discharge opening 42 provided at the pump cover 57 through the discharge port of the pump cover 57. A direction in which the intake opening 41 is sucked is orthogonal to a direction in which oil is discharged from the discharge opening 42. Thereby, it is possible to reduce a pressure loss from the intake opening to the discharge opening and it is possible to make a flow of oil smooth.

As shown in FIG. 2, the intake opening 41 is disposed on the side in which the board 82*a* is disposed with respect to the motor part 10. Thereby, an additionally required disposition space is minimized by arranging a disposition space of the intake opening 41 and a disposition space of the board 82*a* in an overlapping manner and it is possible to reduce the size of the electric oil pump 1 in the radial direction.

As shown in FIG. 2 and FIG. 3, the case 50 has a board housing part 84 that extends from the cylindrical part 13*d* of the motor housing 13 in the direction (+X side) orthogonal to the axial direction and is recessed to the +Y side. In addition, the board housing part 84 extends from one side end of the cylindrical part 13*d* of the motor housing 13 in the axial direction to the other side end. The board housing part 84 has a bottomed container shape and has a rectangular shape when viewed toward the +Y side. The board 82*a* is accommodated in the board housing part 84. Thereby, it is possible to reduce the size of the electric oil pump 1 in the direction (Y axis direction) orthogonal to the axial direction.

As shown in FIG. 2 and FIG. 3, the electric oil pump 1 is attached to an attachment surface provided on a bottom surface of a transmission (not shown). The electric oil pump 1 is accommodated in an oil pan provided below the transmission. The electric oil pump 1 sucks oil in the oil pan from the intake opening 41 and discharges it from the discharge opening 42. The case 50 has a plurality of attachment parts 63 attached to the attachment surface of the transmission. In the present embodiment, the attachment part 63 is provided at the tip of an arm 50*a* that extends obliquely outward from corners on both sides in the axial direction at the −Y side end of the board housing part 84 when viewed toward the +X side. In addition, the attachment part 63 is provided at the tip of an arm 50*b* that extends obliquely outward from each of both sides in the axial direction of the outer surface of the cylindrical part 13d of the motor housing 13 opposite to the side on which the board housing part 84 is positioned with respect to the cylindrical part 13d of the motor housing 13.

The attachment part 63 has a through-hole 64 at the center. A bolt (not shown) passes through the through-hole 64 and the electric oil pump 1 is attached to an attachment surface of the transmission using the bolt. The attachment part 63 has a contact surface that comes in contact with the attachment surface when the electric oil pump 1 is attached to the attachment surface.

Figure 4:
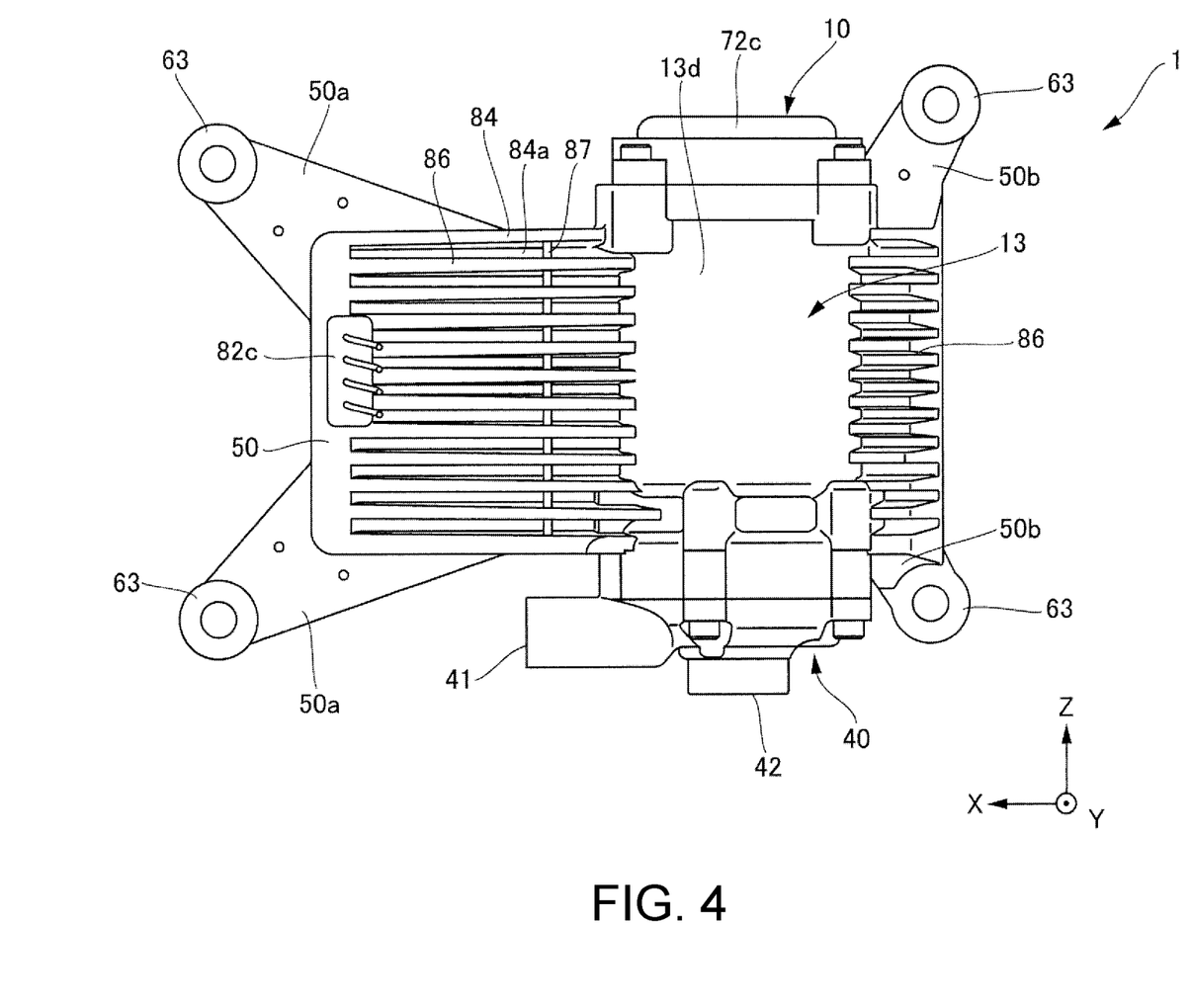
FIG. 4 is a rear view of the electric oil pump according to the first embodiment.

FIG. 4 is a rear view of the electric oil pump 1 according to the present embodiment. As shown in FIG. 4, the case 50 has a plurality of heat dissipating fins 86 that extend in the X axis direction on the outer surface of the +Y side of the cylindrical part 13d of the motor housing 13 opposite to the side on which the board housing part 84 is positioned with respect to the cylindrical part 13d of the motor housing 13. The heat dissipating fin 86 dissipates heat generated from the electric oil pump 1.

As shown in FIG. 4, the board housing part 84 has a plurality of heat dissipating fins 86 that protrude from a bottom 84a of the board housing part 84 on the +Y axis side and extend in the X axis direction. The plurality of heat dissipating fins 86 are disposed at intervals in the axial direction. The heat dissipating fins 86 dissipate heat generated from the board 82a and the motor part 10.

As shown in FIG. 3, the board cover 61 is disposed at an opening of the board housing part 84 and blocks the opening of the board housing part 84. The board cover 61 is disposed parallel to the board 82a. Thereby, it is possible to reduce the size of the electric oil pump 1 in the direction (Y axis direction) orthogonal to the axial direction. The board cover 61 has a plurality of fixing parts 85 fixed to the case 50. In the present embodiment, the fixing part 85 is a bolt. When the electric oil pump 1 is attached to the attachment surface of the transmission by the attachment part 63, the board cover 61 is disposed parallel to the attachment surface of the transmission. Thereby, it is possible to reduce the size of the electric oil pump 1 in the direction (Y direction) orthogonal to the axial direction.

Figure 5:
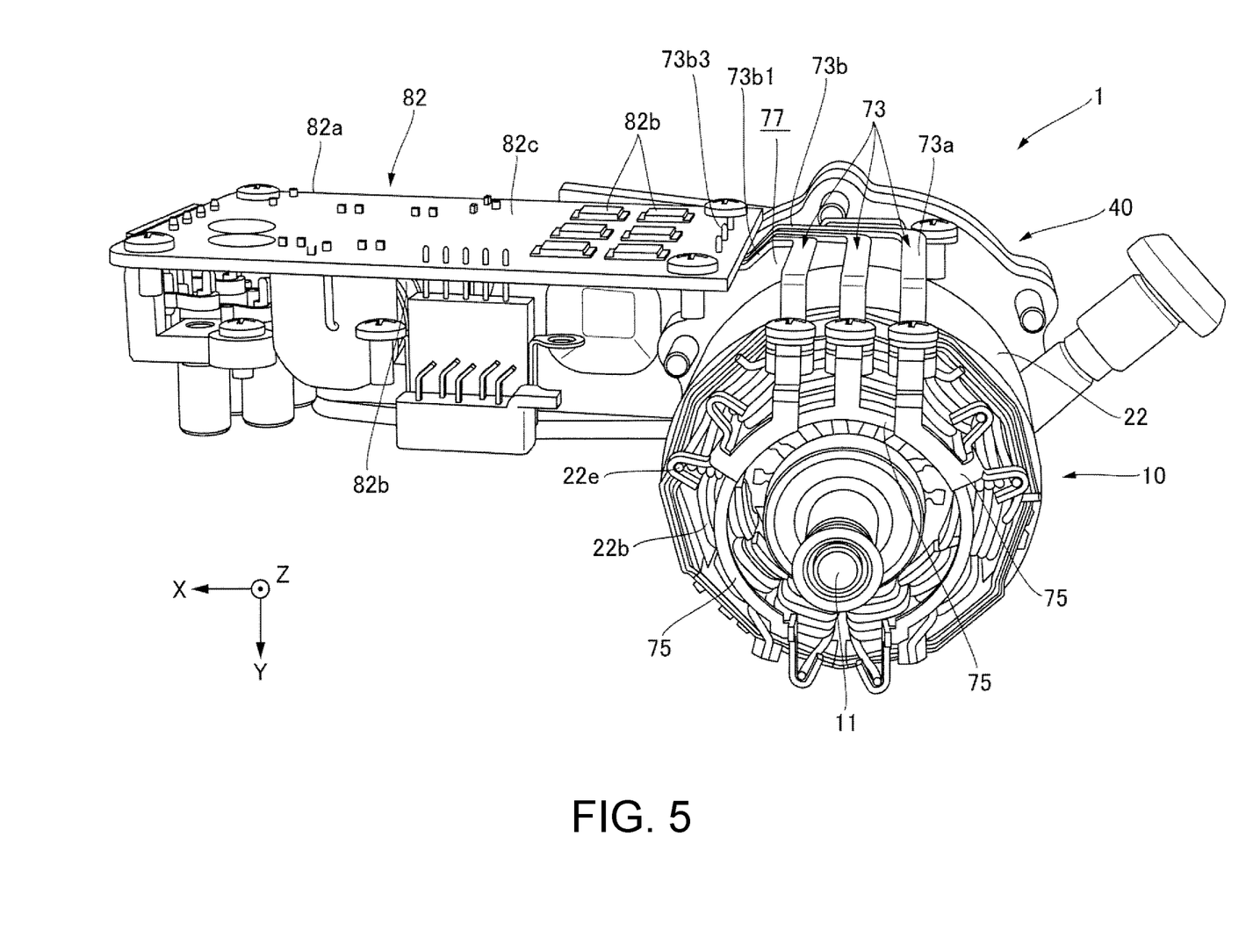
FIG. 5 is a perspective view of an internal structure of the electric oil pump when viewed from the motor part side.
Figure 6:
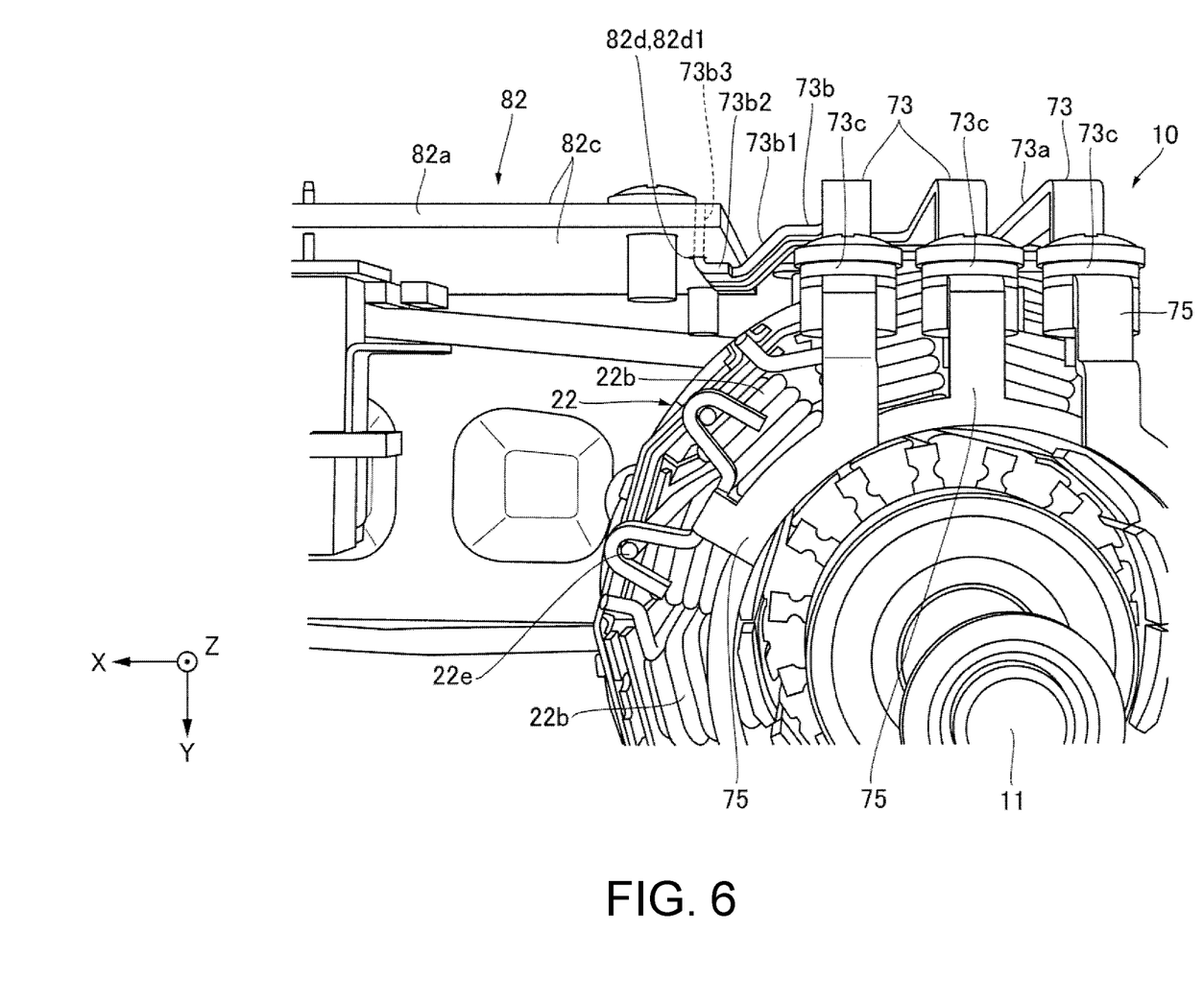
FIG. 6 is an enlarged internal structure view of the electric oil pump in which a part connecting a board and a bus bar is enlarged.

FIG. 5 is a perspective view of an internal structure of the electric oil pump 1 when viewed from the side of the motor part 10. FIG. 6 is an enlarged internal structure view of the electric oil pump 1 in which a part connecting the board 82a and a bus bar 73 is enlarged. As shown in FIG. 2 and FIG. 5, the board 82a is disposed outside of the stator 22 in the radial direction and within the range of the motor part 10 in the axial direction, and a surface 82c of the board 82a is disposed to face the stator 22 and extends in the axial direction. In the present embodiment, the board 82a has a rectangular shape in a plan view, one end side (+Y side) of the board 82a is disposed near the outer circumferential surface of the stator 22, and the other end side (−Y side) of the board 82a extends in a direction (Y axis direction) crossing the axial direction. In the present embodiment, as shown in FIG. 3, one end side (+Y side) of the board 82a is disposed at a position closer to the cylindrical part 13d than the board cover 61 is. Therefore, the surface 82c of the board 82a can be disposed to face and be near to the stator 22. Therefore, the length of the board 82a that extends from the stator 22 in a direction (Y axis direction) orthogonal to the axial direction and the length of the electric oil pump 1 in a direction (X axis direction) orthogonal to the board 82a are shortened, and it is possible to reduce the size of the electric oil pump 1.

The board 82a has the surface 82c on which the electronic component 82b is mounted. In the present embodiment, the board 82a has a plate shape and has the planar surface 82c on both sides in the X axis direction. The electronic component 82b is mounted on these surfaces 82c. On one end side (+Y side) of the board 82a, the bus bar 73 is connected to a coil end 22e that extends from the coil 22b. In the present embodiment, the bus bar 73 is connected to the coil end 22e through a connecting bus bar 75.

As shown in FIG. 2 and FIG. 5, the bus bar 73 is disposed between the board 82a and the coil end 22e. In the present embodiment, the bus bar 73 has a first bus bar part 73a that is disposed with a gap 77 therebetween with respect to the outer circumferential surface of the stator 22 and extends in the axial direction. In addition, the bus bar 73 has a second bus bar part 73b that extends from an end opposite to the side connected to the coil end 22e of the first bus bar part 73a to one end side (+Y side end) of the board 82a and is connected to the board 82a.

As shown in FIG. 6, the second bus bar part 73b has an inclined part 73b1 that extends along the outer circumferential surface of the stator 22. In the present embodiment, the inclined part 73b1 extends in a direction inclined to the side (+Y side) of the stator toward the +X side. The tip of the inclined part 73b1 is positioned between the surface 82c and the stator 22 toward the stator 22 of the board 82a. In addition, the second bus bar part 73b has a bus bar side connection part 73b2 that extends from the inclined part 73b1 to the side opposite to the side on which the second bus bar part 73b is connected to the first bus bar part 73a and is connected to the board 82a.

On the other hand, the board 82a has a board side connection part 82d connected to the bus bar side connection part 73b2 on one end side of the board 82a. The bus bar side connection part 73b2 and the board side connection part 82d are disposed at positions overlapping the stator 22 when viewed in a direction (Y axis direction) orthogonal to the axial direction. The bus bar side connection part 73b2 has a connection terminal part 73b3 that linearly extends in a direction (+X side direction) away from the outer circumferential surface of the stator 22. In the present embodiment, the bus bar side connection part 73b2 extends in the −Y axis direction. The board side connection part 82d has a through-hole 82d1 through which the connection terminal part 73b3 penetrates on one end side of the board 82a.

As shown in FIG. 6, the stator 22 has a plurality of coils 22b through which a polyphase current flows. In the present embodiment, the stator 22 has a 3-phase coil 22b. The motor part 10 has the plurality of bus bars 73 connected to respective coil ends 22e of the plurality of coils 22b. In the present embodiment, the motor part 10 has three bus bars 73. A connection end 73c of the bus bar 73 connected to each of the plurality of coil ends 22e and the plurality of coil ends 22e is linearly (refer to FIG. 2) disposed on the outer side in the axial direction with respect to the other side end of the stator 22 in the axial direction and in the circumferential direction of the stator 22. Therefore, compared to when the connection end 73c of the bus bar 73 is nonlinearly disposed in the circumferential direction of the stator 22, the length of the motor part 10 in the axial direction can be shortened.

On the other hand, as shown in FIG. 6, the bus bar side connection part 73b2 and the board side connection part 82d connected to the side of the board 82a of the plurality of bus bars 73 are linearly disposed in the axial direction. Therefore, compared to when the bus bar side connection part 73b2 and the board side connection part 82d are nonlinearly disposed not in the axial direction, the length of the second bus bar part 73b can be shortened.

As shown in FIG. 2, the respective first bus bar parts 73a of the plurality of bus bars 73 are disposed at predetermined intervals in the circumferential direction of the stator 22. In the present embodiment, the first bus bar part 73a extends in the axial direction and the plurality of first bus bar parts 73a are disposed to extend parallel to each other. In addition, the respective second bus bar parts 73b of the plurality of bus bars 73 are disposed at predetermined intervals therebetween in the axial direction of the stator 22. In the present embodiment, the second bus bar part 73b extends in the Y axis direction and the plurality of second bus bar parts 73b are disposed to extend parallel to each other.

Next, actions and effects of the electric oil pump 1 will be described. As shown in FIG. 1 and FIG. 2, when the motor part 10 of the electric oil pump 1 is driven, the shaft 11 of the motor part 10 rotates, and the outer rotor 47b also rotates as the inner rotor 47a of the pump rotor 47 rotates. When the pump rotor 47 rotates, oil sucked from the intake opening 41 of the pump part 40 moves into the housing part 60 of the pump part 40, and is discharged from the discharge opening 42.

(1) Here, as shown in FIG. 5, the board 82a of the electric oil pump 1 according to the present embodiment is disposed outside the stator 22 in the radial direction and within the range of the motor part 10 in the axial direction, and the surface 82c of the board 82a extends in the axial direction. Therefore, the surface 82c of the board 82a can be disposed in the axial direction of the shaft 11. In addition, the surface 82c of the board 82a can be disposed to face the stator 22. Therefore, the length of the board 82a that extends from the stator 22 in a direction (X axis direction) orthogonal to the axial direction and the length of the electric oil pump 1 in a direction (Y axis direction) orthogonal to the board 82a can be shortened. Therefore, it is possible to reduce the size of the electric oil pump 1.

(2) In addition, as shown in FIG. 5, the bus bar 73 is disposed between the board 82a and the coil end 22e. Therefore, compared to when the bus bar 73 is disposed in an area in which the motor part 10 and the board 82a do not face each other when viewed in the Y axis direction, and when the bus bar 73 is disposed in an area in which the motor part 10 and the board 82a do not face each other when viewed in the axial direction, it is possible to prevent the size of the electric oil pump 1 from increasing.

(3) In addition, the bus bar 73 has the first bus bar part 73a that is disposed with the gap 77 with respect to the outer circumferential surface of the stator 22 and extends in the axial direction. Therefore, when viewed in a direction orthogonal to the axial direction (Y axis direction), it is possible to reduce a risk of the first bus bar part 73a from protruding to the outside from the outer circumferential surface of the stator 22. Therefore, it is possible to prevent an amount of the position of the board 82a with respect to the stator 22 shifted toward the +X axis direction from increasing.

(4) In addition, the bus bar 73 has the second bus bar part 73b that extends from an end opposite to the side connected to the coil end 22e of the first bus bar part 73a to one end side of the board 82a and is connected to the board 82a. Therefore, the length of the second bus bar part 73b can be shortened.

(5) In addition, as shown in FIG. 6, the second bus bar part 73b has an inclined part 73b1 that extends along the outer circumferential surface of the stator 22. Therefore, the second bus bar part 73b can be disposed so that it is not in contact with the board 82a, and connection of the second bus bar part 73b to the board 82a can becomes easier.

(6) In addition, the bus bar side connection part 73b2 and the board side connection part 82d are disposed at positions overlapping the stator 22 when viewed in a direction (Y axis direction) orthogonal to the axial direction. Therefore, when viewed in a direction orthogonal to the axial direction, the length of the board 82a that protrudes to the outside of the stator 22 in the radial direction can be shortened.

(7) In addition, a connection end 73c of the bus bar 73 connected to each of the plurality of coil ends 22e and the plurality of coil ends 22e is linearly disposed on the outer side in the axial direction with respect to the other side end of the stator 22 in the axial direction and in the circumferential direction of the stator 22. Therefore, compared to when the connection end 73c of the bus bar 73 is nonlinearly disposed in the circumferential direction of the stator 22, the length of the motor part 10 in the axial direction can be shortened.

(8) In addition, the bus bar side connection part and the board side connection part are linearly disposed in the axial direction. Therefore, compared to when the bus bar side connection part and the board side connection part are nonlinearly disposed not in the axial direction, the length of the second bus bar part can be shortened.

(9) In addition, the stator 22 has a 3-phase coil 22b. Therefore, compared to when the stator 22 has a coil exceeding three phases (for example, 5 layers, 7 layers, etc.), it is possible to reduce the size of the motor part 10.

(10) In addition, as shown in FIG. 5, the respective first bus bar parts 73a of the plurality of bus bars 73 are disposed at predetermined intervals therebetween in the circumferential direction of the stator 22. Therefore, the plurality of first bus bar parts 73a can be compactly disposed.

(11) In addition, the respective second bus bar parts 73b of the plurality of bus bars 73 are disposed at predetermined intervals therebetween in the axial direction of the stator 22. Therefore, the plurality of second bus bar parts 73b can be compactly disposed.

(12) In addition, as shown in FIG. 6, the bus bar side connection part 73b2 has the connection terminal part 73b3 that linearly extends in a direction away from the outer circumferential surface of the stator 22, and the board side connection part 82d has a through-hole 82d1 through which the connection terminal part 73b3 penetrates on one end side of the board 82a. Therefore, when the board 82a is moved toward the connection terminal part 73b3 from a tip side in a direction in which the connection terminal part 73b3 extends, the connection terminal part 73b3 can pass through the through-hole 82d1. Therefore, it is possible to provide the electric oil pump 1 in which it is easy to perform an operation for passing the connection terminal part 73b3 through the through-hole 82d1.

While the exemplary embodiments of the disclosure have been described above, the disclosure is not limited to such embodiments and various modifications and alternations within the spirit and scope of the disclosure can be made. These embodiments and modifications thereof are included in the scope and spirit of the disclosure and also included in the scope described in the claims and equivalents thereof.

Features of the above-described exemplary embodiments and the modifications thereof may be combined appropriately as long as no conflict arises.

While some embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electric oil pump comprising:
a motor part having a shaft disposed along a central axis that extends in an axial direction;
a pump part that is positioned on one side of the motor part in the axial direction and is driven by the motor part via the shaft and discharges oil; and
a control part configured to control an operation of the motor part,
wherein the motor part includes a rotor fixed to one side of the shaft in the axial direction, a stator disposed to face the rotor, and a motor housing in which the rotor and the stator are accommodated,
wherein the pump part includes a pump rotor attached to the shaft that protrudes from the one side of the motor part in the axial direction and a pump housing having a housing part in which the pump rotor is accommodated,
wherein the control part includes an electronic component and a board having a surface on which the electronic component is mounted,
wherein the board is disposed outside the stator in a radial direction and within a range of the motor part in the axial direction, the surface of the board is disposed to face the stator, one end side of the board is near the stator, and the other end side of the board extends in a direction crossing the axial direction, and
wherein from a perspective in the axial direction, an area range of a projection of the surface of the board along a direction perpendicular to the surface of the board is not overlapped with an area range of a projection of the shaft along the direction perpendicular to the surface of the board,
wherein the one end side of the board is not overlapped with the shaft in the radial direction perpendicular to the surface of the board,
wherein the motor housing has a contact surface attached to an attachment part,
wherein the contact surface is along the surface of the board.

2. The electric oil pump according to claim 1,
wherein the stator has a coil,
wherein the motor part has a bus bar connected to a coil end that extends from the coil, and
wherein the bus bar has a first bus bar part that is disposed with a gap therebetween with respect to an outer circumferential surface of the stator and extends in the axial direction.

3. The electric oil pump according to claim 2,
wherein the bus bar has a second bus bar part that extends from an end opposite to the side connected to the coil end of the first bus bar part to the one end side of the board and is connected to the board.

4. The electric oil pump according to claim 3,
wherein the second bus bar part has an inclined part that extends along the outer circumferential surface of the stator.

5. The electric oil pump according to claim 4,
wherein the second bus bar part has a bus bar side connection part that extends from the inclined part to the side opposite to the side on which the second bus bar part is connected to the first bus bar part and is connected to the board,
wherein the board has a board side connection part connected to the bus bar side connection part on the one end side of the board, and
wherein the bus bar side connection part and the board side connection part are disposed at positions overlapping the stator from a perspective in a direction orthogonal to the axial direction.

6. The electric oil pump according to claim 5,
wherein the stator has a plurality of coils through which a polyphase current flows,
wherein the motor part has a plurality of bus bars connected to the respective coil ends of the plurality of coils, and
wherein a connection end of the bus bar connected to each of the plurality of coil ends and the plurality of coil ends is linearly disposed outside in the axial direction with respect to one side end of the stator in the axial direction and in a circumferential direction of the stator.

7. The electric oil pump according to claim 6,
wherein the bus bar side connection part and the board side connection part are linearly disposed in the axial direction.

8. The electric oil pump according to claim 6,
wherein the stator has a 3-phase coil.

9. The electric oil pump according to claim 6,
wherein the respective first bus bar parts of the plurality of bus bars are disposed at predetermined intervals therebetween in the circumferential direction of the stator.

10. The electric oil pump according to claim 6,
wherein the respective second bus bar parts of the plurality of bus bars are disposed at predetermined intervals therebetween in the axial direction of the stator.

11. The electric oil pump according to claim 7,
wherein the bus bar side connection part has a connection terminal part that linearly extends in a direction away from the outer circumferential surface of the stator, and
wherein the board side connection part has a through-hole through which the connection terminal part penetrates on the one end side of the board.

12. The electric oil pump according to claim 1, wherein the attachment part is provided on the other end side of the board and another side of the motor part.

* * * * *